(12) United States Patent
Krebs

(10) Patent No.: US 11,020,948 B2
(45) Date of Patent: Jun. 1, 2021

(54) HIGH PRESSURE DECORATIVE LAMINATE HAVING A TOP LAYER OF ENERGY CURED ACRYLATED URETHANE POLYMER

(71) Applicant: WILSONART LLC, Austin, TX (US)

(72) Inventor: Robert R. Krebs, Georgetown, TX (US)

(73) Assignee: WILSONART LLC, Austin, TX (US)

( * ) Notice: Subject to any disclaimer, the term of this patent is extended or adjusted under 35 U.S.C. 154(b) by 183 days.

(21) Appl. No.: 16/146,674

(22) Filed: Sep. 28, 2018

(65) Prior Publication Data

US 2019/0091983 A1  Mar. 28, 2019

Related U.S. Application Data

(60) Provisional application No. 62/564,590, filed on Sep. 28, 2017.

(51) Int. Cl.
| | |
|---|---|
| *B32B 37/10* | (2006.01) |
| *B32B 37/06* | (2006.01) |
| *B32B 37/24* | (2006.01) |
| *B32B 29/00* | (2006.01) |

(52) U.S. Cl.
CPC ........... *B32B 29/005* (2013.01); *B32B 37/06* (2013.01); *B32B 37/10* (2013.01); *B32B 37/24* (2013.01); *B32B 2037/243* (2013.01); *B32B 2255/12* (2013.01); *B32B 2255/26* (2013.01); *B32B 2260/028* (2013.01); *B32B 2260/046* (2013.01); *B32B 2310/0831* (2013.01); *B32B 2451/00* (2013.01)

(58) Field of Classification Search
None
See application file for complete search history.

(56) References Cited

U.S. PATENT DOCUMENTS

| | | | |
|---|---|---|---|
| 4,789,604 A | 12/1988 | Van Der Hoeven | |
| 4,801,495 A | 1/1989 | Van Der Hoeven | |
| 4,927,572 A | 5/1990 | Van Der Hoeven | |
| 5,453,464 A | 9/1995 | Witzeman et al. | |
| 5,454,464 A | 9/1995 | Witzeman et al. | |
| 5,976,304 A | 11/1999 | Horvath et al. | |
| 6,001,893 A | 12/1999 | Vaidya et al. | |
| 6,340,504 B1 | 1/2002 | Neumann et al. | |
| 6,383,644 B2 | 5/2002 | Fuchs | |
| 6,716,891 B1* | 4/2004 | Meisenburg | C09D 4/06 428/413 |
| 6,767,980 B2 | 7/2004 | Yurugi et al. | |
| 7,160,605 B2 | 1/2007 | Fusco | |
| 8,568,849 B2 | 10/2013 | Shi et al. | |
| 9,511,570 B2 | 12/2016 | Nakagawa et al. | |
| 9,707,740 B2 | 7/2017 | Arai | |
| 9,707,746 B2 | 7/2017 | McGuire, Jr. | |
| 9,739,067 B2 | 8/2017 | Zhang | |
| 9,809,013 B2 | 11/2017 | Haller et al. | |
| 2003/0003257 A1 | 1/2003 | Kendall et al. | |
| 2004/0089409 A1 | 5/2004 | Kendall et al. | |
| 2006/0042492 A1 | 3/2006 | Garitano | |
| 2006/0204729 A1 | 9/2006 | Kobayashi | |
| 2006/0234026 A1* | 10/2006 | Huusken | B32B 5/024 428/292.1 |
| 2007/0231551 A1 | 10/2007 | Hama | |
| 2008/0057276 A1 | 3/2008 | Rasmusson et al. | |
| 2008/0057300 A1 | 3/2008 | Paiva et al. | |
| 2008/0292875 A1 | 11/2008 | Van De Wall | |
| 2011/0143071 A1 | 6/2011 | Jung | |
| 2013/0230712 A1 | 9/2013 | Kifuku | |
| 2013/0266759 A1 | 10/2013 | Kim et al. | |
| 2014/0186610 A1 | 7/2014 | Pervan | |
| 2014/0242316 A1 | 8/2014 | Shih et al. | |
| 2014/0242871 A1 | 8/2014 | Yasui et al. | |
| 2015/0191042 A1 | 7/2015 | Ma et al. | |
| 2015/0191043 A1 | 7/2015 | Ma et al. | |
| 2015/0290910 A1* | 10/2015 | Haller | C08J 7/0427 428/201 |
| 2016/0017167 A1 | 1/2016 | Magnusson et al. | |
| 2016/0153190 A1 | 6/2016 | Doehring | |
| 2016/0200092 A1 | 7/2016 | Doehring | |
| 2017/0210839 A1 | 7/2017 | Lorenz et al. | |
| 2018/0015691 A1 | 1/2018 | Nagasaki et al. | |
| 2018/0015776 A1 | 1/2018 | Wloczysiak et al. | |
| 2018/0050527 A1* | 2/2018 | Ma | B32B 7/06 |

FOREIGN PATENT DOCUMENTS

| | | |
|---|---|---|
| CA | 2050616 A1 | 1/1994 |
| CN | 1229023 A1 | 9/1999 |
| EP | 0474470 B1 | 3/1992 |
| EP | 2527408 A1 | 11/2012 |
| JP | H110180758 A | 7/1998 |
| JP | H111268192 A | 10/1998 |
| JP | S63307945 A | 12/1998 |
| JP | 3789694 A | 10/2001 |
| JP | 4978226 A | 11/2007 |
| JP | 6086358 A | 7/2017 |
| JP | 2017171794 A | 9/2017 |
| KR | 2008/0092591 A | 10/2008 |
| KR | 101317063 B1 | 10/2013 |
| KR | 2018/0010635 A | 1/2018 |
| WO | 88/06973 A1 | 9/1998 |
| WO | 98/56990 A1 | 12/1998 |
| WO | 2012/122206 A1 | 9/2012 |
| WO | 2013/133862 A1 | 9/2013 |
| WO | 2013/154695 A2 | 10/2013 |

* cited by examiner

*Primary Examiner* — Sheeba Ahmed

(74) *Attorney, Agent, or Firm* — Welsh Flaxman & Gitler LLC

(57) ABSTRACT

A decorative laminate lay-up includes a top layer of a radiation and thermally cured composition coated directly onto an untreated decorative paper layer, a paper layer impregnated with resin, and a core layer composed of one or more sheets of paper impregnated with resin.

21 Claims, 2 Drawing Sheets

HIGH PRESSURE DECORATIVE LAMINATE HAVING A TOP LAYER OF ENERGY CURED ACRYLATED URETHANE POLYMER

CROSS REFERENCE TO RELATED APPLICATION

This application claims the benefit of U.S. Provisional Application No. 62/564,590, entitled "HIGH PRESSURE DECORATIVE LAMINATE HAVING A TOP LAYER OF ENERGY CURED ACRYLATED URETHANE POLYMER," filed Sep. 28, 2017.

BACKGROUND OF THE INVENTION

1. Field of the Invention

The invention relates to decorative laminates. More particularly, the invention relates to a high pressure decorative laminate having a top layer of energy cured acrylated urethane polymer.

2. Description of the Related Art

As general background, high pressure decorative laminates prepared by heat and pressure consolidation have been produced commercially for a number of years, and have found widespread acceptance in the building and furniture industry as counter and tabletops, bathroom and kitchen work surfaces, wall paneling, flooring products, partitions and doors. These high pressure decorative laminates may be described as containing a number of laminae consolidated to foini a unitary structure carrying a surface decoration. The surface decoration may range from something as simple as a solid color to something as complex as an embossed simulated wood grain finish.

High pressure decorative laminates generally include plural layers of synthetic resin impregnated paper sheets bonded under heat and pressure to form a unitary structure. In normal practice, a decorative laminate sheet assembly (or laminate lay-up), from the bottom up, includes a core of one or more phenolic resin impregnated sheets, above which lies a decorative melamine-formaldehyde impregnated sheet. The decorative sheet may be further covered with a melamine-formaldehyde impregnated overlay. The core, or base, functions to impart rigidity to the high pressure decorative laminate and is usually bonded to a solid substrate which may, or may not, be formed prior to the initial laminating steps.

The decorative sheet provides the high pressure decorative laminate with an attractive appearance. The decorative sheet also dictates the surface characteristics of the high pressure decorative laminate. For example, the composition of the decorative sheet dictates the high pressure decorative laminate's resistance to chemical agents, heat, light, shock and abrasion. Decorative sheets are commonly manufactured from high quality 50-125 ream weight, 60 grams per square meter to 200 grams per square meter, pigment filled, alpha cellulose paper impregnated with a water alcohol solution, or water solution, of melamine-formaldehyde resin. The resin impregnated decorative sheets are subsequently dried, partially cured, and finally cut into sheets. The pigment filled, alpha cellulose paper of the decorative sheet, may include a solid color, a decorative design, or a photogravure reproduction, or digital inkjet printed paper, of natural materials, such as, wood, marble, leather, etc. The aesthetic characteristics of the cellulose paper are revealed as the laminate's decorative design upon completion of the high pressure decorative laminate.

The core may, for example, include a plurality of sheets of 140 grams per square meter to 485 grams per square meter Kraft paper that is impregnated with phenolic resin. The Kraft paper is impregnated throughout and bonded with a substantially completely cured phenolic resin which has been converted to a thermoset state during the initial laminating step.

The substrate may be a pre-cured plastic laminate, such as glass fiber-reinforced thermoset polyester resin laminates and the like, a wood product, such as hardboard, wood waste or particle boards, plywood and the like, a mineral base board, such as, cement-asbestos board, sheet rock, plaster board, and the like, or a combination of substrates.

As disclosed in Applicant's own U.S. Pat. No. 9,079,452, entitled "Decorative Laminate And Method For Manufacturing Same," which is incorporated herein, the high pressure decorative laminate may also include a bottom layer composed of Kraft paper with a release coating on one side thereof (for example, parchment treatment). It is also contemplated the bottom layer could be a parchment paper or a paper layer with a thermoplastic material extruded onto one side of the Kraft paper. The purpose of the bottom layer is to release one sheet of high pressure decorative laminate from another when they are pressed in a multi-opening press in a so called back-to-back fashion.

High pressure decorative laminates are generally manufactured by placing the resin impregnated core and decorative sheet between steel plates and subjecting the decorative laminate stack to heat and pressure for a time sufficient to consolidate the high pressure decorative laminate and cure the resins (generally about 25 minutes to an hour). The heat and pressure force the resin in the paper sheets to flow, cure and consolidate the sheets into a unitary laminated mass referred to in the art as a high pressure decorative laminate. Finally, the formed high pressure decorative laminate is bonded to a reinforcing substrate, such as, plywood, hardboard, asbestos board, particle board or the like.

Generally, more than one high pressure decorative laminate is formed at one time. Multiple high pressure decorative laminates are formed by assembling a plurality of decorative laminate sheet assemblies into a stack. Release sheets are positioned between the decorative laminate sheet assemblies to separate the various laminates stacked together. After consolidation, the release sheets allow the individual high pressure decorative laminates to be separated.

As discussed above and as those skilled in the art appreciate, the top surface of high pressure decorative laminates described above is cured melamine-formaldehyde resin. Melamine-formaldehyde resin has many useful properties. It is transparent, non-yellowing, heat resistance, chemically non-reactive, scratch resistance, and by embossing on an appropriate surface can have gloss levels ranging from extreme matt, gloss <2, and extreme gloss, gloss >110, as well as values in-between. One reason high gloss values are possible is due to the high refractive index value of cured melamine-formaldehyde resin. The high refractive index provides unique optical properties to the surface.

However, high pressure decorative laminates made with melamine-formaldehyde resin exhibits disadvantages. A disadvantage of the high refractive index is the visibility of fingerprints on the high pressure decorative laminate surface. The refractive index of the oils left by a finger is less than the refractive index of the melamine-formaldehyde resin surface. Fingerprints visually distract from a smooth surface. Fingerprints also give the impression that the surface is not clean. Another disadvantage of melamine-formaldehyde resin is the relatively high heat capacity of the resin. This property is noticed by users of high pressure decorative laminates in that it feels cold to the touch. Consumers today like surfaces that feel warm to the touch for applications like kitchen worktops, case goods in stores, office furniture, and wall panels. Another disadvantage of melamine-formaldehyde resin is the hardness of the material. Some consumers today like a "soft touch" surface. While soft touch is not easily defined, it generally is thought of as having a pleasing feel to human touch which may include a warm feel, a feeling of grip between the surface and the human hand, or a feeling of a slight friction between the surface and the hand or other body part.

Textured high pressure decorative laminates are also very popular. The textured surfaces range from relatively shallow depressions, such as, textured (e.g., satin, matte or semi-gloss) surfaces, to relatively deeply sculpted or embossed surfaces having a noticeable three-dimensional effect, such as, wood grain, leather, slate, abstract patterns, creative designs etc. The textured high pressure decorative laminates are commonly manufactured using release sheets with the desired surface texture, which surface texture is imparted to the high pressure decorative laminate during the application of heat and pressure in the manufacturing process. Textures are also created by using etched stainless steel press plates.

SUMMARY OF THE INVENTION

It is, therefore, an object of the present invention to provide a decorative laminate lay-up including a top layer of a radiation and thermally cured composition coated directly onto an untreated decorative paper layer, a paper layer impregnated with resin, and a core layer composed of one or more sheets of paper impregnated with resin.

It is also an object of the present invention to provide a decorative laminate lay-up wherein the paper layer is a low basis weight paper impregnated with resin.

It is another object of the present invention to provide a decorative laminate lay-up wherein the low basis weight paper is impregnated with melamine-formaldehyde resin.

It is a further object of the present invention to provide a decorative laminate lay-up wherein the core layer is composed of one or more color sheets of paper impregnated with melamine-formaldehyde resin.

It is also an object of the present invention to provide a decorative laminate lay-up wherein the paper of the core layer is a Kraft paper that contains melamine-formaldehyde resin on one side and a phenolic resin on the other side.

It is another object of the present invention to provide a decorative laminate lay-up wherein the radiation and thermally cured composition is composed of 60% to 90%, by weight, urethane acrylate, 8% to 38%, by weight, reactive diluent, 1.0% to 10%, by weight, photo initiator, and 0.5%-5%, by weight, thermal initiator.

It is a further object of the present invention to provide a decorative laminate lay-up wherein the radiation and thermally cured composition further includes aluminum oxide.

It is also an object of the present invention to provide a decorative laminate lay-up wherein the radiation and thermally cured composition employs a first curing mechanism resulting in creation of free radicals with UV light and a second curing mechanism involving polymerization with the application of thermal energy.

It is another object of the present invention to provide a decorative laminate including a top layer of a radiation and thermally cured composition coated directly onto an untreated decorative paper layer, a paper layer impregnated with resin, and a core layer composed of one or more sheets of paper impregnated with resin.

It is a further object of the present invention to provide a decorative laminate manufactured in accordance with the method providing a top layer of a radiation and thermally cured composition coated directly onto an untreated decorative paper layer to define a coated decorative paper layer, providing a paper layer impregnated with resin, providing a core layer composed of one or more sheets of paper impregnated with resin, stacking the top layer, the paper layer, and the core layer to form a laminate lay-up, and consolidating the laminate lay-up under heat and pressure to form the decorative laminate.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

Figure 1:
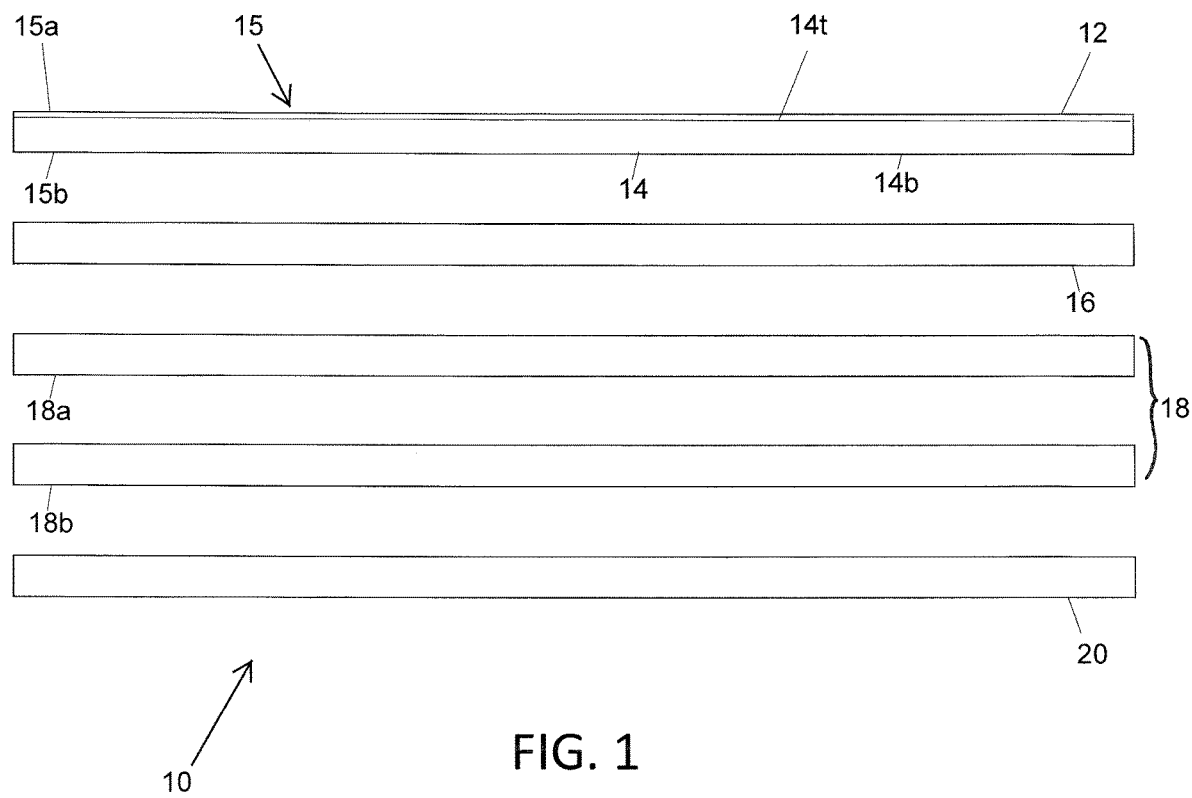
FIG. 1 is a schematic of a laminate lay-up in accordance with the present invention.

With reference to FIG. 1, a decorative laminate lay-up 10 in accordance with the present invention is disclosed. The laminate lay-up 10 includes a top layer 12 of a radiation and thermally cured composition, in particular, an energy cured acrylated urethane polymer having a chemical composition mainly composed of acrylate and acrylated urethane oligomers (before final polymerization). The top layer 12 is coated directly onto an untreated decorative paper layer 14, resulting in a coated decorative paper layer 15 having an upper surface 15a (that is, the surface composed of the exposed top layer 12) and a lower surface 15b (that is the surface that is bonded to the low basis weight paper layer 16).

Figure 2:
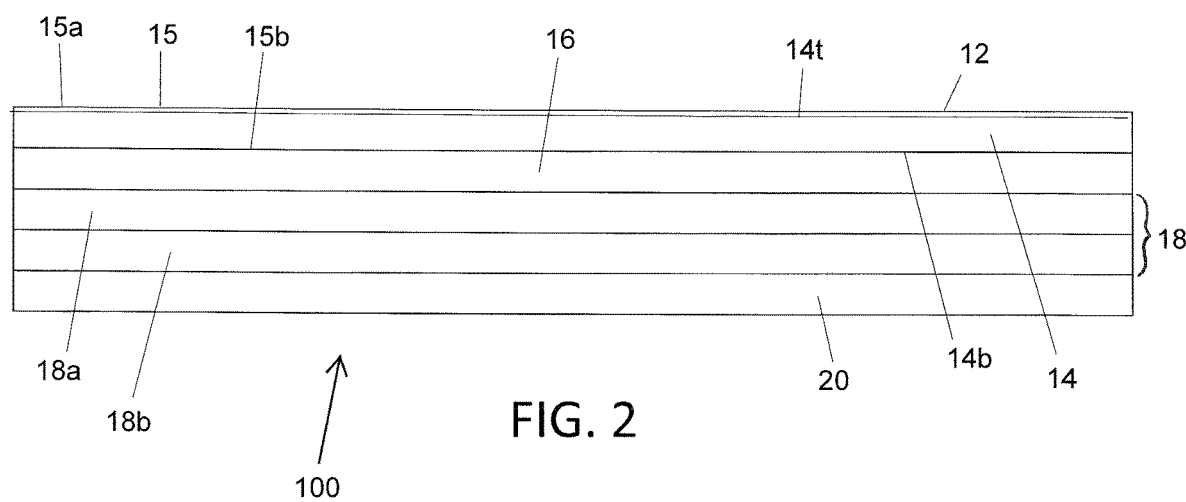
FIG. 2 is a schematic of a decorative laminate in accordance with the present invention.

Positioned beneath the coated decorative paper layer 15, in particular, the decorative paper layer 14, the laminate lay-up 10 also includes a low basis weight paper, for example, an overlay type paper, defining a low basis weight paper layer 16, that has been impregnated with melamine-formaldehyde resin, a core layer 18 composed of one or more sheets of Kraft paper impregnated with phenol-formaldehyde resin, and a bottom layer 20 composed of a material allow for ready release of laminates consolidated together. The decorative laminate lay-up 10 is ultimately subjected to heat and pressure as described below in order to form a high pressure decorative laminate 100 (see FIG. 2) in accordance with the present invention.

The decorative laminate lay-up 10 is assembled by stacking the coated decorative paper layer 15 (that is, decorative paper layer 14 coated with the top layer 12 of the radiation and thermally cured composition), the low basis weight paper layer 16, the core layer 18, and the bottom layer 20. That is, the sheets used in the production of the high pressure decorative laminate 100 in accordance with the present invention are stacked in preparation for the heating and pressure steps used to consolidate the high pressure decorative laminate 100.

While a specific layering pattern is disclosed in accordance with a preferred embodiment of the present invention, the layering pattern may be varied, somewhat, without departing from the spirit of the present invention. For example, it is possible to replace the low basis weight paper layer with a Kraft paper that contains melamine-formaldehyde resin on the side next to the backside, that is, the lower surface, of the coated decorative paper layer and phenolic resin on the other side. This two-side coating can be achieved using the two-sided coating technology of Wilsonart LLC as disclosed in U.S. Pat. No. 6,610,358 to Williams, entitled "SYSTEM AND METHOD FOR TWO SIDED SHEET TREATMENT," which is incorporated herein by reference.

The decorative paper layer 14 in accordance with the present invention may be selected from a wide array of sheets commonly used as decorative sheets in the industry. For example, the decorative paper layer 14 may be a solid color (for example, white) or include an aesthetically appealing pattern. As discussed above, the decorative paper layer 14 provides the high pressure decorative laminate 100 with an attractive appearance. The top layer 12 of the radiation and thermally cured composition, in combination with the decorative paper layer 14, dictate the surface characteristics of the final decorative laminate 100. For example, the composition of the radiation and thermally cured composition and the decorative paper layer 14 help to dictate the decorative laminate's resistance to chemical agents, heat, light, shock and abrasion.

In accordance with the present invention, the decorative paper layer 14 is composed of a sheet of decorative paper commonly manufactured from high quality pigment filled, alpha cellulose paper having a basis weight of approximately 50 grams per square meter to 200 grams per square meter, preferably 50 grams per square meter to 120 grams per square meter, and more preferably 80 grams per square meter. In contrast with conventional decorative paper layers used in the manufacture of the high pressure decorative laminates, the decorative paper layer 14 of the present invention is untreated (with the exception of the application of the top layer 12 as described below in greater detail). The pigment filled, alpha cellulose paper of the decorative paper layer 14, may include a solid color, a decorative design, or a photo-gravure reproduction of natural materials, such as, wood, marble, leather, etc. The aesthetic characteristics of the cellulose paper are revealed as the laminate's decorative design upon completion of the decorative laminate 100.

As mentioned above, the top layer 12 of a radiation and thermally cured composition is applied directly to the top surface 14t of the decorative paper layer 14 so as to form the coated decorative paper layer 15. As will be explained below in greater detail, the application of the radiation and thermally cured composition to the top surface 14t of the decorative paper layer 14 is conducted prior to stacking the various layers of the laminate lay-up 10.

The radiation and thermally cured composition is composed of a formulation having the following composition:
  60% to 90%, by weight, urethane acrylate;
  8% to 38%, by weight, reactive diluent, such as, isobornyl acrylate;
  1.0% to 10%, by weight, photo initiator, for example, a combination of 0.5% to 5% by weight benzophenone and 0.5% to 5% by weight triethanol amine; and
  0.5% to 5%, by weight, a thermal initiator, for example, tert-Butyl peroxybenzoate.

In accordance with an exemplary embodiment, the following composition is used:
  70.28%, by weight, undiluted aliphatic 9-functional urethane acrylate (for example, Ebecryl 8602 as manufactured by Allnex Company);
  26.21%, by weight, isobornyl acrylate (for example, SR506C as manufactured by Sartomer Company);
  1.43%, by weight, benzophenone (as manufactured by Sigma-Aldrich);
  1.16%, by weight, triethanol amine (as manufactured by Sigma-Aldrich); and
  0.920%, by weight, tert-Butyl peroxybenzoate (for example, Luperox P, as manufactured by Arkema Inc., Luperox P).

In accordance with an alternate embodiment, the following formulation has been found to produce decorative laminates exhibiting desirable results. This formulation is applied and cured in the same manner as the composition disclosed above.
  50.6%, by weight, undiluted aliphatic 9-functional urethane acrylate (for example, Ebecryl 8602 as manufactured by Allnex Company);
  25.0%, by weight, undiluted urethane diacrylate (for example, Ebecryl 270 as manufactured by Allnex Company);
  12.5%, by weight, isobornyl acrylate (for example, SR506C as manufactured by Sartomer Company);
  8.3%, by weight, hexanediol diacrylate;
  1.4%, by weight, triethanol amine (as manufactured by Sigma-Aldrich);
  1.4% by weight, benzophenone; and
  0.8%, by weight, tert-Butyl peroxybenzoate (for example, Luperox P, as manufactured by Arkema Inc., Luperox P).

The radiation and thermally cured composition is designed to have two curing mechanisms. The first curing mechanism involves the creation of free radicals with the application of UV light. In accordance with a preferred embodiment, a conventional mercury doped florescent lamp is used as the light source for UV curing of the radiation and thermally cured composition. The lamp produces UV radiation that is absorbed by the benzophenone of the radiation and thermally cured composition. The excited benzophenone starts a series of reactions that results in free radicals on the isobornyl acrylate and molecules of the undiluted aliphatic 9-functional urethane acrylate molecules. These free radicals cause polymerization of the reactive sites on the isobornyl acrylate and oligomer of the undiluted aliphatic 9-functional urethane acrylate. The amount of UV radiation the radiation and thermally cured composition is exposed to is controlled to start the polymerization reactions but not to fully react the system. The exposure energy is controlled to partially cure the system, this is sometimes called a B-staged cure. B-staging is important because it will create a surface that is not tacky but still contains reactive functionality.

The tert-butyl peroxybenzoate is added to the radiation and thermally cured composition to initiate polymerization with the application of thermal energy; that is, complete polymerization of the radiation and thermally cured composition during the platen press processing stage resulting in the decorative laminate 100. Tert-butyl peroxybenzoate is a free radical initiator. While tert-butyl peroxybenzoate is used as a thermal initiator in accordance with a disclosed embodiment, it is appreciated other thermal initiators may be used without departing form the spirit of the present invention. It is, however, preferred to use a liquid thermal initiator. The thermal initiator is chosen so that is it stable at room temperature and also stable at the processing temperature when it is coated onto the decorative paper. Tert-butyl peroxybenzoate achieves this goal as it has a 1 hour half-life at 122 degrees Celsius. Care must be taken during transport of the coated decorative paper to prevent it from being thermally activated. If it is necessary to transport the coated decorative paper in accordance with the present invention, it is important that the coated decorative paper materials be kept at a safe temperature, that is, not exposed to excessively high temperatures prior to the application of heat and pressure resulting in the decorative laminate 100.

During the compression molding process, the laminate lay-up 10 is stacked in a known manner and placed between stainless steel plates. The laminate lay-up 10 or "sandwich" is then placed between heated platens. The platens are closed to press the laminate lay-up 10 with approximately 1400 psi or 100 bar of pressure. During the pressing the thermal initiator, that is, the tert-butyl peroxybenzoate, will start additional polymerization reactions within the radiation and thermally cured composition described above, the polymerization reaction will create a fully reacted and cross-linked surface.

Also, during the heating and pressure molding process the melamine-formaldehyde of the low basis weight paper layer 16, which is positioned directly below decorative paper layer 14, will liquefy, flow, and cure into a thermoset polymer. During the flow phase some of the melamine-formaldehyde resin will diffuse into the decorative paper layer 14. This will ensure that consolidation between the decorative paper layer 14, the low basis weight paper layer 16, the core layer 18, and the bottom layer 20. During the pressing under heat, the phenol-formaldehyde of the core layer 18 will also liquefy, flow, and cure into a thermoset polymer, like a normal high pressure decorative laminate product. Some of the phenol-formaldehyde liquid resin will mix with the melamine-formaldehyde resin of the low basis weight paper layer 16 above it, as normally happens during the production of high pressure decorative laminate 100.

The radiation and thermally cured composition provides good physical and chemical properties as the top layer 12 in the production of high pressure decorative laminates 100. UV cured products, such as the radiation and thermally cured composition, are characterized as having excellent surface hardness and chemical resistance. Additionally, the radiation and thermally cured composition formulation used in accordance with present invention has a fast cure response to UV light. This is exposed to 150-200 millijoules per square centimeter. Faster formulations can be prepared using different UV absorbers, dyes, and sensitizing reagents.

While a specific formulation for the top layer is disclosed above, it is appreciated other acrylate-urethane resin formulations can be used. In addition, there are many small monomers available that could replace the isobornyl acrylate. Still further the isobornyl acrylate could be left out of the radiation and thermally cured composition. It should be noted that where the isobornyl acrylate is not added to the radiation and thermally cured composition, the radiation and thermally cured composition has a very high viscosity of approximately 100,000 centipoise at room temperature. This high viscosity makes it difficult to apply the radiation and thermally cured composition with normal liquid coating methods.

Additionally, if the undiluted aliphatic 9-functional urethane acrylate is the only acrylate source in the radiation and thermally cured composition, the resulting cured coating is very hard but is also brittle. Brittle coatings are not valued in high pressure decorative laminate products due to difficulties in fabrication and if the product is flexed, surface cracks appear. This is overcome in accordance with the disclosed embodiment by adding the isobornyl acrylate that reduces the cross-link density, which reduces the brittleness. For example, isobornyl acrylate is a clear liquid at room temperature with a viscosity of 8 centipoise at 25 degrees Celsius. At the amount used in the radiation and thermally cured composition disclosed above, the viscosity of the radiation and thermally cured composition is reduced to approximately 2000 centipoise at room temperature. At an elevated temperature of 45 degrees Celsius, the viscosity was approximately 1500 centipoise. At this viscosity, the radiation and thermally cured composition is suitable for coating with a roll coater, wire wound rod coater, or extrusion die coater. At the temperature of 45 degrees Celsius, the radiation and thermally cured composition is thermally stable and a viscosity increase was not measured within a 1 hour working window.

In accordance with the present invention, and consolidating the process for the manufacture of decorative laminate in accordance with the present invention, the radiation and thermally cured composition is coated on the top surface 14t of the decorative paper layer 14 (that is, the decorative sheet) so as to ultimately define the top layer 12 of the laminate lay-up 10 and the resulting high pressure decorative laminate 100. As discussed above, the decorative paper layer 14 is selected from traditional decorative papers used in the high pressure decorative laminate industry, has a basis weight of approximately 80 grams per square meter, and is not treated or impregnated with melamine-formaldehyde resin.

The radiation and thermally cured composition is applied to the decorative side of the decorative paper layer 14 (that is, the top surface 14t) at a coating weight of 40 to 80 grams per square meter. Most of the radiation and thermally cured composition stays at the top surface 14t of the decorative paper layer 14 but some of the radiation and thermally cured composition penetrates into the decorative paper layer 14. In fact, it is acceptable if the backside (or bottom surface 14b) of the decorative paper layer 14 to appear "wet" or changed color like one would expect if that bottom surface 14b had some coating applied to it. The large undiluted aliphatic 9-functional urethane acrylate molecule is less mobile and less likely to migrate through the decorative paper layer 14. The smaller isobornyl acrylate molecules and the UV and thermal initiators are able to migrate through the decorative paper layer 14.

After the radiation and thermally cured composition is applied to the decorative paper layer 14, it is exposed to UV light. The UV light initiates some polymerization on the top surface of decorative paper layer 14 (that is, the surface to which the radiation and thermally cured composition is applied). The amount of UV energy supplied to the surface is approximately 200 millijoules per square centimeter. This amount of energy does not fully cure the radiation and thermally cured composition. This amount of energy greatly increases the viscosity of the radiation and thermally cured composition so that the decorative top surface 15a of the coated decorative paper layer 15, as defined by the top layer 12 applied to the top surface of the decorative paper layer 14, is no longer tacky to the touch or only slightly tacky to the touch, which makes it possible to cut the coated decorative paper layer 14 into sheets that are ultimately used in the formation of laminate lay-ups 10.

Improved wear resistance may be achieved by incorporating aluminum oxide into the radiation and thermally cured composition. In particular, and regardless of whether the former or latter embodiment of the formulation is used, 100 grams of the formulation is added 3%, by weight, aluminum oxide (preferably, in powder form). In accordance with a preferred embodiment, the aluminum oxide is 12S from the Micro Abrasives Corporation of Westfield, Mass. 01086 USA. The aluminum oxide powder is mixed into the radiation and thermally cured composition. It is easily dispersed into the radiation and thermally cured composition. Due to the high viscosity of the radiation and thermally cured composition, the aluminum oxide settles very slowly, and a working life of one hour is easily achieved before additional mixing is required. Additionally, the small particles of aluminum oxide do not cause noticeable wear to gravure coating cylinders or Meyer rods used for controlling coat weights over a several hour coating run or trial. It was found that at 3%, by weight, addition level for the aluminum oxide the scuff resistance was maximized while maintaining excellent clarity.

For convenience of handling the coated and B-staged paper, a cover sheet may be applied over the top layer 12 after the UV exposure. The cover sheet is generally a thin, thermoplastic material such as polyethylene or polypropylene. Its purpose is to prevent coated sheets from sticking together and also to prevent dust and dirt from settling onto the coated surface. The sheet is then ready to become the top layer 12 of the composite. Normally, the cover sheet is removed from the decorative layer before the press plate is placed on top of the decorative layer so that the texture of the press plate is accurately reproduced on the decorative laminate. Removing the cover sheet also allows the gloss of the press plate to be more accurately reproduced on the surface.

The low basis weight paper layer 16 is preferably a melamine-formaldehyde impregnated paper layer. In accordance with a preferred embodiment, low basis weight paper layer is composed of paper having a basis weight of 18 grams per square meter to 40 grams per square meter, preferably 18 grams per square meter to 25 grams per square meter. It is impregnated with melamine-formaldehyde resin to give a low basis weight paper layer that is 60% to 85% resin content after appropriate drying to remove the solvent from the melamine-formaldehyde resin.

The core layer 18 is preferably one or more phenolic resin impregnated sheets 18a, 18b, although other materials may be used without departing from the spirit of the present invention. For example, the core layer 18 includes sheets of 120 grams per square meter to 500 grams per square meter dry phenolic resin impregnated Kraft paper, which has been impregnated with a phenolic resin content of approximately 30+/–5%. The Kraft paper is impregnated throughout and bonded with a substantially cured phenolic resin which has been converted to a thermoset state during the initial laminating step.

The bottom layer 20 is preferably a parchment treatment sheet of Kraft paper impregnated with a phenolic formaldehyde resin as disclosed in U.S. Pat. No. 9,079,452, entitled "Decorative Laminate and Method for Manufacturing Same," which is incorporated herein. However, and as discussed above, the bottom layer may take other forms without departing from the spirit of the present invention. For example, the bottom layer could be a dual coated sheet of Kraft paper treated in the manner disclosed in U.S. Pat. No. 6,610,358 to Williams, entitled "SYSTEM AND METHOD FOR TWO SIDED SHEET TREATMENT," which is incorporated herein by reference.

While a traditional Kraft paper is disclosed above for us in a conjunction with the present invention, it is also contemplated the core may be composed of a plurality of sheets of paper manufactured from pigmented and bleached fibers so that various colors are available (that is, "color core"). In contrast with the previously described core papers, these sheets of paper are impregnated with melamine-formaldehyde resin. Because phenolic resin is red to brown in color, and is not light stable, it undesirably darkens slowly when exposed to ambient lighting. Melamine-formaldehyde resin does not appreciable change the color of the core paper and melamine-formaldehyde resin is light stable. As a result it does not darken with time and exposure to light. By making the change to "color core" the dark line between the core and the decorative sheet associated with most high pressure laminate products is eliminated.

In accordance with a preferred embodiment, the basis weight of the paper sheets used in this "color core" embodiment is 210 grams per square meter. The paper is impregnated with normal high pressure laminate type melamine-formaldehyde resin to a resin content of 32-34%, and more preferably 32+/–0.5%. Multiply sheets of the "color core" paper are used to produce a product with a specific thickness. Generally 3 or 4 sheets of "color core" paper are used.

The colors used in the sheets making up the core are chosen to match the overall color of the decorative sheet to the color of the core. For example, if the decorative sheet represented a walnut wood grain pattern the color core would have a dark brown color. If the decorative sheet represented a maple wood the color core would be a light tan or khaki colored.

In accordance with the present invention, the decorative laminate 100 of the present invention is formed in much the same manner as conventional decorative laminates. The layers are first stacked (to form a decorative laminate lay-up 10) and placed between steel plates. The decorative laminate stack is then subjected to temperatures in the range of 121 degrees Celsius to 160 degrees Celsius and pressure of about 56.24 kilograms per square centimeter to 112.48 kilograms per square centimeter for a time sufficient to consolidate the decorative laminate and cure the resins (generally about 25 minutes to an hour).

The pressure and heat force the resin in the paper sheets to flow, cure and consolidate the sheets into a unitary laminated mass referred to in the art as a decorative high pressure decorative laminate 100. Generally, more than one decorative laminate is formed at one time. Multiple decorative laminates are formed by inserting a plurality of sheets in a stack. Release sheets are positioned between the assembled sheets to separate the various decorative laminates stacked together. Upon pressing between suitable laminate presses plates, the release sheet allows release between the first lay-up 10 and the adjacent lay-up 10. A platen press assembly, as is well known in the lamination art, provides the necessary heat and/or pressure during lamination. After consolidation, the release sheets allow the individual decorative laminates to be separated.

In accordance with an alternate embodiment, the core layer and the bottom layer may be replaced with particleboard or medium density fiberboard. In accordance with such an embodiment, the decorative paper layer, the low basis weight paper layer, and particleboard/medium density fiberboard would be stacked in that order and thermally fused using heat pressure commonly used in the manufacture of low-pressure melamine panels.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A decorative laminate lay-up, comprising:
   a top layer of a radiation and thermally cured composition coated directly onto an untreated decorative paper layer consisting essentially of alpha cellulose paper having a basis weight of approximately 50 grams per square meter to 200 grams per square meter;
   a paper layer impregnated with resin; and
   a core layer composed of one or more sheets of paper impregnated with resin.

2. The decorative laminate lay-up according to claim 1, wherein the paper layer is a low basis weight paper impregnated with resin.

3. The decorative laminate lay-up according to claim 2, wherein the low basis weight paper is impregnated with melamine-formaldehyde resin.

4. The decorative laminate lay-up according to claim 1, wherein the core layer is composed of one or more color sheets of paper impregnated with melamine-formaldehyde resin.

5. The decorative laminate lay-up according to claim 1, wherein the paper of the core layer is a Kraft paper that contains melamine-formaldehyde resin on one side and a phenolic resin on the other side.

6. The decorative laminate lay-up according to claim 1, wherein the radiation and thermally cured composition is comprised of 60% to 90%, by weight, urethane acrylate, 8% to 38%, by weight, reactive diluent, a photo initiator, and 0.5%-5%, by weight, thermal initiator.

7. The decorative laminate lay-up according to claim 1, wherein the radiation and thermally cured composition employs a fust curing mechanism resulting in creation of free radicals with UV light and a second curing mechanism involving polymerization with the application of thermal energy.

8. A decorative laminate, comprising:
   a top layer of a radiation and thermally cured composition coated directly onto an untreated decorative paper layer consisting essentially of alpha cellulose paper having a basis weight of approximately 50 grams per square meter to 200 grams per square meter;
   a paper layer impregnated with resin; and
   a core layer composed of one or more sheets of paper impregnated with resin.

9. The decorative laminate according to claim 8, wherein the paper layer is a low basis weight paper impregnated with resin.

10. The decorative laminate according to claim 9, wherein the low basis weight paper is impregnated with melamine-formaldehyde resin.

11. The decorative laminate according to claim 8, wherein the core layer is composed of one or more color sheets of paper impregnated with melamine-formaldehyde resin.

12. The decorative laminate according to claim 8, wherein the paper of the core layer is a Kraft paper that contains melamine-formaldehyde resin on one side and a phenolic resin on the other side.

13. The decorative laminate according to claim 8, wherein the radiation and thermally cured composition is comprised of 60% to 90%, by weight, urethane acrylate, 8% to 38%, by weight, reactive diluent, a photo initiator, and 0.5%-5%, by weight, thermal initiator.

14. The decorative laminate according to claim 8, wherein the radiation and thermally cured composition employs a first curing mechanism resulting in creation of free radicals with UV light and a second curing mechanism involving polymerization with the application of thermal energy.

15. A decorative laminate manufactured in accordance with the method comprising:
   providing a top layer of a radiation and thermally cured composition coated directly onto an untreated decorative paper layer consisting essentially of alpha cellulose paper having a basis weight of approximately 50 grams per square meter to 200 grams per square meter to define a coated decorative paper layer;
   providing a paper layer impregnated with resin;
   providing a core layer composed of one or more sheets of paper impregnated with resin;
   stacking the top layer, the paper layer, and the core layer to form a laminate lay-up; and
   consolidating the laminate lay-up under heat and pressure to form the decorative laminate.

16. The decorative laminate manufactured in accordance with the method according to claim 15, wherein the paper layer is a low basis weight paper impregnated with resin.

17. The decorative laminate manufactured in accordance with the method according to claim 16, wherein the low basis weight paper is impregnated with melamine-formaldehyde resin.

18. The decorative laminate manufactured in accordance with the method according to claim 15, wherein the core layer is composed of one or more color sheets of paper impregnated with melamine-formaldehyde resin.

19. The decorative laminate manufactured in accordance with the method according to claim 15, wherein the paper is a Kraft paper that contains melamine-formaldehyde resin on one side and a phenolic resin on the other side.

20. The decorative laminate manufactured in accordance with the method according to claim 15, wherein the radiation and thermally cured composition is comprised of 60% to 90%, by weight, urethane acrylate, 8% to 38%, by weight, reactive diluent, a photo initiator, and 0.5%-5%, by weight, thermal initiator.

21. The decorative laminate manufactured in accordance with the method according to claim 15, wherein the radiation and thermally cured composition employs a first curing mechanism resulting in creation of free radicals with UV light and a second curing mechanism involving polymerization with the application of thermal energy.

* * * * *